United States Patent Office 3,563,829
Patented Feb. 16, 1971

3,563,829
METHOD FOR PREARRANGING POLYAMIDE RESIN BELTS AND STRAPS TO SUBSEQUENT WELDING OPERATIONS
Livio Zenere, Via Margherita 9, Valdagno, Italy
Filed Dec. 1, 1967, Ser. No. 687,242
Claims priority, application Italy, Dec. 22, 1966, 14,767/66
Int. Cl. B32b *31/18*
U.S. Cl. 156—249
4 Claims

ABSTRACT OF THE DISCLOSURE

A resin belt or strap for operating machinery such as used for spinning or weaving textiles, is to have its adjacent ends bonded together to provide an operating loop. The belt is of a suitable resin material such as polyamide and its ends are to be fused or welded together at the operating site to form a loop directly on the apparatus or machinery. For this purpose, end portions of the belt material or length, before shipping to the situs of use, are oppositely-beveled or slit to provide complementary, endwise-inclined faces that match each other. Each inclined face is then wetted by a bonding or gluing agent or material that is a solvent for the resin of the belt. Next, a protective enclosing sheath or sleeve of complementary shape and of a different resin material that is not affected by the bonding-solvent wetting agent, is slid over each treated end portion of the belt length to extend along an adjacent normal thickness portion thereof. A side of each end portion of the belt, such as the opposite or fully flat side, may be given a temporary or mechanical adherence with an opposing inner side of its sheath by wetting the sheath with a type of adhesive that is a non-solvent with respect to the resin of the belt and resin of the sheath, for example, water glass (sodium silicate). The sheaths are used to protect the treated ends of the belt during shipment, storage, and until the belt is installed. The sheaths also protect the belt while it is being inserted and mounted on the operating machinery; they are pulled or stripped-off the belt ends to expose the wetted surfaces to permit such surfaces to be applied in a complementary manner with each other and clamped for heat and pressure bonding. The unitary physical bond thus produced is permanent and enables the belt to be placed in use as an operating loop.

---

This invention relates to an improved method of preparing and bonding belt or strap ends to form a machinery operating loop and to an improved belt end structure.

As well known, polyamide resin strips for making belts and straps have to be attached at the ends thereof. This is carried out by using gluing or bonding materials which are solvents for such resins, and then fusing by compression and heating. The fusing or welding operations have to be carried out exclusively in site, particularly where spinning and weaving machines are involved. Previously bevelled or tapered belts to be connected have to be wetted with the suitable gluing-solvent material by a not too abundant spreading thereof in order not to create a weakening area. This operation is to be carried out in site, as well as the overlapping of the edges and the compression thereof by means of a suitable clamp, also by heating the joint or connection, so as to fuse the whole, thus carrying out the desired bonding operation.

Since, as stated, all of these operations are now carried out directly on the operating machine and thus under inconvenient conditions affecting the successful result of the operations and, accordingly the life of said straps, attempts were made to insert a polyamide resin foil between the edges to be connected, so as to provide for welding by pressing the ends on one another. If this accelerated the operations, it involved on the other hand an undue thickening in the securing area, which causes jerks to occur at connection passage under the pulleys, thus giving rise to detrimental vibrations, particularly where the rotational speeds were very high, as those at present being used.

In order to overcome these disadvantages and to make welding operations more efficient, quick and reliable, a method was designed and carried into effect which involves pre-treating out of site the belt ends to be secured and carrying out in site the bonding operation only.

This division into two distinct operating steps will allow the two operations to be both effected with the required caution and accuracy, which cannot be done in a single step, such as that now being used.

Therefore, an object of the invention has been to devise a method for pre-treating the ends of polyamide resin belts and straps to prearrange them for a welding-bonding operation, in order that they will reach installation under such conditions as to be readily joined in a chemical or welded bond at the place of use.

Figure 1:
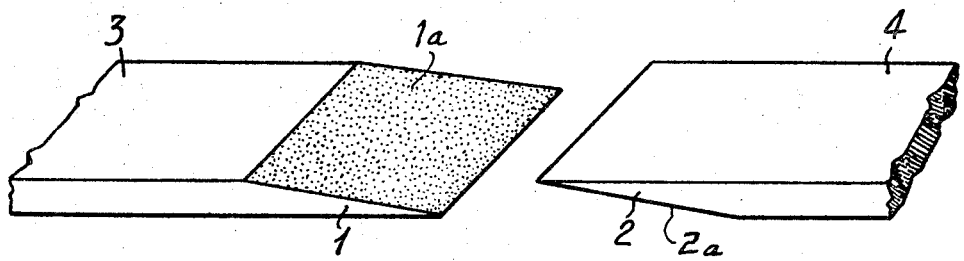
Figure 2:
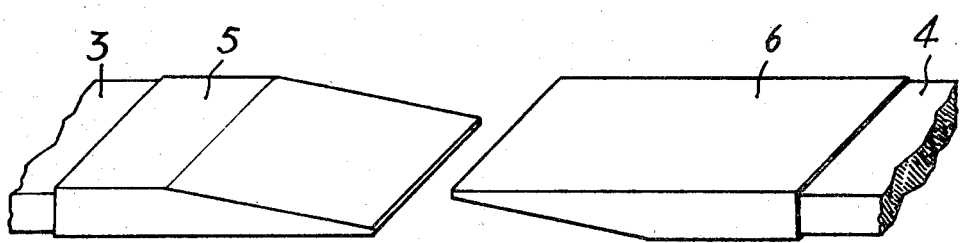

In the drawings, FIG. 1 is a somewhat diagrammatic perspective view showing a pair of belt end portions as prepared for bonding; and FIG. 2 is a view on the same scale as and of the same type as FIG. 1, but showing a final form of the belt and portions, as processed.

In FIG. 1, two adjacent end sections 2 and 3 of a belt or strap have been cut, formed or bevelled on one face to provide complementarily-inclined end portions 1 and 2. In the next step, inclined faces 1a and 2a of the end sections 1 and 2 are wetted with a solvent-adhesive for the resin material of the belt material.

Briefly, the treating operations consist of:

(1) Bevelling end portions 1 and 2 of the belt end sections 3 and 4 in such a manner that material removal is effected in opposition;

(2) Wetting the bevelled faces or surfaces 1a and 2a only with gluing-solvent material for the resin of the belt length and according to the strictly required amount. The most suitable gluing-solvent material for polyamide resin belts, is an alcohol resorcin and polyamide resin solution in the proportions of 60% resorcin, 40% alcohol and additionally, eleven parts per hundred parts of polyamide resin.

(3) Covering adjacent end sections 3 and 4, end portions 1 and 2 and inclined face 1a and 2a that have been previously wetted with the gluing material, each with a cover, sleeve member or sheath 5 or 6. Each of the sheaths or sleeves 5 and 6 is formed of materials unaffected by the gluing-solvent material or solution; it is to be removed immediately before welding or bonding the belt ends. The material of which each sheath 5, 6 is formed may, for instance, be polyethylene or polyvinyl chloride made adhesive on one inner face, preferably on the face that is opposite its inclined face; this adhesive is both ineffective for or non-reactive with the polyamide resin of the strip or the gluing solution.

By this method it was found that should the wetting on the inclined face intended for matching even dry up prior to use, a gluing-solvent material coating will be obtained which, as a result of temperature rise for bonding, is suitable for improving and accelerating the desired fusion bonding operation.

It is to be undesrtood that the chemical details as indicated relative to the gluing-solvent material and the material making up the protective sheath are given by mere way of non-restrictive example, since other groups of products may be used, provided that the behavior thereof ensures the results contemplated.

Briefly, in accordance with the invention, a length of resin belt material is used which is to constitute a closed-end belt loop for driving machinery, such as spindles of a textile machine, where the speeds now may exceed 11,000 to 12,000 r.p.m. The ends of the belt length that are to be joined at the factory or place of machinery or apparatus operation are beveled or inclined in a complementary manner, such that they may be applied in a mating relation with each other to provide a smooth, uniform thickness, continuation portion of the belt length. The inclined faces that are to be mated are wetted or treated with a gluing solvent that can be best and accurately accomplished at the place of belt manufacture. Next, each adjacent end and its wetted inclined face is enclosed in a resin sheath that is non-reactive or non-sensitive with respect to the wetting solvent. Each sheath serves as a protecting and moisture retaining means for the ends of the belt ends during transportation, storage, threading and mounting of the belt length on the machinery or equipment. When the belt length is positioned on the machinery at the place of installation, the sheaths are removed, as by stripping or pulling them off the ends of the belt length. The inclined wetted faces of the belt ends are then clamped together in a complementary relation under pressure clamps and bonding, fusing or welding heat is applied to fully activate the gluing solvent and unitize the two end portions to form a complete belt loop.

I claim:

1. A method of making resin belts and straps for mounting in loop form on operating machinery, wherein adjacent ends of a belt length are oppositely bevelled to provide inclined faces that match one another, and the inclined faces are wetted with a gluing-solvent material containing the same resin elements making up the belt length; which comprises, enclosing each of the wetted ends of the belt length within a sheath of a material unaffected by action of the gluing-solvent material, retaining the sheaths in place on the wetted ends of the belt length during transportation, storage and installation of the belt length on the machinery, removing the sheaths from the wetted ends after the belt length is installed, applying the exposed inclined wetted faces of the ends of the belt length in complementary matching abutment with each other and then fusion-bonding the wetted faces together under heat and pressure to form a closed belt loop on the machinery.

2. A method as defined in claim 1 wherein the belt length is of a polyamide resin, and the inclined faces are wetted by the gluing-solvent material, applied in solution form.

3. A method as defined in claim 1 wherein the gluing-solvent material is applied to the inclined faces in solution form and the solution is made up of alcohol, resorcin and polyamide resin, and each sheath is formed of a resin of the class consisting of polyethylene and polyvinyl chloride.

4. A method as defined in claim 3 wherein an adhesive layer is applied to an inner face of each sheath before the sheath is employed to enclose an associated wetted end of the belt length, and the adhesive coating is of an adhesive that is non-reactive with the resin material of the belt length.

References Cited

UNITED STATES PATENTS 2,993,826   7/1961   Mendelsohn _____ 156—331

FOREIGN PATENTS 706,860   3/1965   Canada _____ 156—157

CARL D. QUARFORTH, Primary Examiner

B. H. HUNT, Assistant Examiner

U.S. Cl. X.R.

156—157, 159, 247